United States Patent
Tervonen et al.

(10) Patent No.: US 11,463,936 B2
(45) Date of Patent: Oct. 4, 2022

(54) MULTIHOP NETWORK ROUTING EXTENSION

(71) Applicant: Arm Cloud Technology, Inc., San Jose, CA (US)

(72) Inventors: Mika Antero Tervonen, Oulu (FI); Jarkko Paso, Oulu (FI); Juha Heiskanen, Oulu (FI)

(73) Assignee: Izuma Tech, Inc., Evant, TX (US)

( * ) Notice: Subject to any disclaimer, the term of this patent is extended or adjusted under 35 U.S.C. 154(b) by 146 days.

(21) Appl. No.: 16/699,204

(22) Filed: Nov. 29, 2019

(65) Prior Publication Data

US 2021/0168694 A1 Jun. 3, 2021

(51) Int. Cl.
*H04W 40/22* (2009.01)
*H04W 40/24* (2009.01)

(52) U.S. Cl.
CPC .......... *H04W 40/22* (2013.01); *H04W 40/24* (2013.01)

(58) Field of Classification Search
None
See application file for complete search history.

(56) References Cited

U.S. PATENT DOCUMENTS

| | | | | |
|---|---|---|---|---|
| 6,845,091 B2* | 1/2005 | Ogier | ................... | H04L 1/1614 |
| | | | | 370/338 |
| 8,743,758 B1* | 6/2014 | Bhargava | ............... | H04L 69/18 |
| | | | | 370/310 |
| 9,300,581 B1* | 3/2016 | Hui | ........................ | H04W 72/10 |
| 10,159,014 B1* | 12/2018 | Parihar | ................ | H04W 72/10 |
| 2005/0072749 A1* | 4/2005 | Primavera | ............. | A61J 11/045 |
| | | | | 215/11.1 |
| 2009/0190521 A1* | 7/2009 | Horn | ................... | H04W 40/248 |
| | | | | 370/315 |
| 2015/0281952 A1* | 10/2015 | Patil | ................... | H04L 63/0815 |
| | | | | 713/168 |
| 2016/0150459 A1* | 5/2016 | Patil | ..................... | H04W 40/02 |
| | | | | 370/328 |
| 2018/0288823 A1* | 10/2018 | Hampel | ................ | H04B 7/155 |
| 2019/0069306 A1* | 2/2019 | Fukuta | ................. | H04W 40/02 |
| 2020/0296624 A1* | 9/2020 | Liu | ..................... | H04W 28/065 |

* cited by examiner

*Primary Examiner* — Brian S Roberts
(74) *Attorney, Agent, or Firm* — Nixon & Vanderhype P.C.

(57) ABSTRACT

An extender device for communication in a multihop network comprises: a first wireless transceiver operable in electronic communication with a border router; a second wireless transceiver operable in electronic communication with one or more network attachable devices; and a routing component operable to cause said extender device to assume routing control of messages received at said first wireless transceiver for one or more said network attachable devices operable to handle messages having a specified identifier.

17 Claims, 8 Drawing Sheets

MULTIHOP NETWORK ROUTING EXTENSION

The present technology relates to the control of communications traffic routing in multihop networks, especially radio frequency networks, and more especially multihop networks such as mesh networks.

It is especially difficult to implement large multihop networks of devices, such as Internet of Things (IoT) devices, where there is a need for external linkage (for example, to the Internet) through border routers. With increasing network sizes, each such border router suffers from an increasing burden on memory (for storing routing information for each device that it services) and processing resource (for processing messages with their protocol overheads). As such networks are scaled up, there is also an increasing effect of size on system operations, for example, an increase in the latency of each message because of the load on the transmission queues at the border router responsible for controlling routing. The feasible depth of networks is also limited by the addressing needs of transmitted packets—as the network grows, the message routing information in the packets increases in size, and thus the increased network depth has the potential for the protocol overheads to completely block the network.

In a first approach to the many difficulties encountered in routing traffic in multihop networks, the present technology provides an extender device for communication in a multihop network, comprising: a first wireless transceiver operable in electronic communication with a border router; a second wireless transceiver operable in electronic communication with one or more network attachable devices; and a routing component operable to cause said extender device to assume routing control of messages received at said first wireless transceiver for one or more said network attachable devices operable to handle messages having a specified identifier.

There is further provided a method of controlling electronic apparatus to control routing of traffic in multihop networks. The method may be computer-implemented, for example in the form of a computer program product.

Implementations of the disclosed technology will now be described, by way of example only, with reference to the accompanying drawings, in which.

Figure 1:
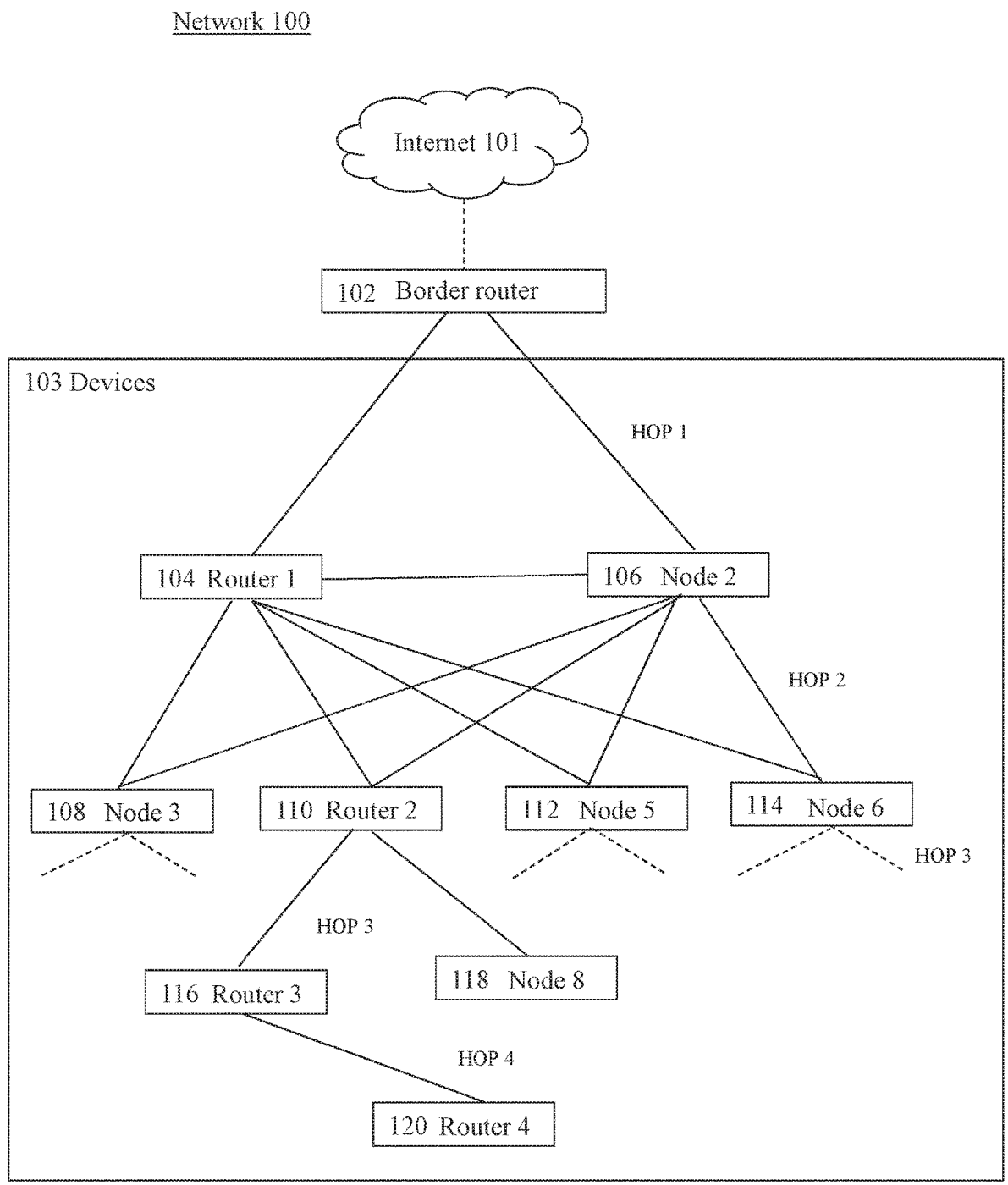
FIG. 1 shows a simplified view of some connections in a network in which the presently described technology may be implemented.

The present technology thus provides apparatus, computer-implemented techniques and logic for controlling traffic in multihop networks by means of extender router devices that relieve the border routers of some of the above-described burdens.

Taking as an example a multihop IoT device network implemented as a Wi-SUN (Wireless Smart Ubiquitous Network) mesh network, an implementation of the present technology provides a new type of mesh device—an extender router device—that comprises two Wi-SUN radio transceivers. The extender router device attaches to the main mesh network using one of the transceivers and then forms a new mesh network with different parameters and starts to advertise the existence of the new network to other devices using the other transceiver.

The extender router device thus seamlessly interposes itself using its two transceivers into the existing main multihop network. The extender router device creates its own Wi-SUN sub-network with its own timing parameters unrelated to those of the main network, acquires an addressing sub-prefix from the main border router and registers as the destination for all addresses included in that sub-prefix. The extender router device assumes some of the responsibilities of the border router of the main multihop network and thus eases the burden on the border router. The extender router device stores the sub-network routing information (for example, using the Routing Protocol for Low power and Lossy Networks—RPL—conventions) and the device address and authentication information for nodes attached to the sub-network. The extender router device is then operable to perform the required authentication handshakes for nodes attached to the sub-network and to handle routing for nodes attached to the sub-network.

The extender router device creates smaller Wi-SUN networks (the sub-networks), and this improves stability of network synchronisation for multicast channels. The use of extender router devices according to implementations of the present technology also allows larger mesh networks to be formed as routed packets need less routing information—this is because every hop in the multihop network needs an address to be added to the packet for onward routing, but the extender restarts the routing address calculation for the routing headers of the packets on their entry to its controlled sub-network.

The use of extender router devices according to implementations of the present technology further spreads the load on communications channels—there are shorter and more contained paths for keep-alive traffic and the shorter network depths add robustness to the main network and to the individual sub-networks. For the same reasons, network formation is quicker, and the nodes in the sub-networks can more rapidly reattach when the sub-network reattaches as a whole after any higher-level network breakages.

In one variant of the present technology, sub-networks may be established for particular classes of device—for example, devices that are of critical importance and thus require the additional robustness and fast recovery from breakages that are afforded by the present technology. In another variant, the sub-network may by implemented using different network technologies from the main network—for example, using a different wireless communication protocol from that used by the main-network.

Where multiple extender router devices are deployed, the RAM/ROM/CPU usage load that previously fell on the border router is distributed across the extender router devices. Importantly, those nodes that belong to the sub-network established under the control of the extender router device need not change their behaviour—to them, the extender router device is simply seen as a border router. Additionally, communications within the multihop network, for example communications over a mesh from node to node, are unaffected, as are communications back up to the border router for outward transmission from the multihop network, which can simply follow the conventional repeated child-to-parent path as usual.

As multihop networks and IoT devices operable in such networks are already known to those of ordinary skill in the modern computing art, there follows only a brief description of the environment in which implementations of the present technology may be constructed and operated.

Since the advent of the Internet, there has been a rapid increase in the interconnectedness of devices capable of storing, processing and communicating data. Now, with the development of what is called the Internet of Things (IoT), devices which were not conventionally equipped to store, process and communicate data are becoming so equipped. More and more devices such as data processing devices are being connected to each other and to computing systems (e.g. servers, web services, registry services, the Cloud), as part of the IoT.

One example is that of a domestic refrigerator that is provided with the capability to recognise encoded data associated with a perishable food item, store the data in device storage, and subsequently, on being triggered by a program that monitored the data, warn a user over a network to a smartphone of an impending "use by" date for the food item. In further examples, relatively small-scale data processing devices such as temperature sensors, healthcare monitors and electronic door locks can be connected to the Cloud so that they can be accessed and controlled using remote computer systems. A door lock may be remotely opened by a remote device via an application, or data from one or more temperature sensors may be aggregated at a remote location and accessed from another device, whilst data from a healthcare monitor may be transmitted from a patient to their doctor's device for real-time diagnosis. Hence, there is an increase in the number and types of devices being utilised as part of the IoT and an increasing need for effective control of the networks that enable communications among such devices and from such devices to the "outside world" by way of the Internet.

Because of the power consumption economies that can be gained by exploiting the spreading of power consumption inherent in their hop-by-hop signal propagation methods, low-power and lossy networks (LLNs), such as networks of IoT devices, are often implemented as multihop networks. LLNs typically consist largely of constrained devices having limited processing power, memory, and sometimes energy, particularly when they are battery operated or energy-harvesting. These nodes are interconnected by lossy links, typically supporting only low data rates, that are typically unstable and may consequently have relatively low packet delivery rates. LLNs are thus often advantageously arranged as multihop networks, such as mesh networks, in which attached devices may act both as leaf nodes performing operations and transmitting/receiving on their own behalf, and also as routers for other attached devices. A transmission in such a network thus normally proceeds in a hop-by-hop fashion from its source device to its target device or devices via one or more intermediate attached devices.

However, multihop networks, while advantageous, also have their problems. One difficulty with conventional large multihop networks is that all the routing, address and authentication information is stored in the border router of the network. All the production and network overhead traffic then places a severe burden on the border router and a heavy load on the data bandwidth of the mesh network. Such an arrangement also creates a high RAM requirement for the border routers as all the routing, address and authentication information for the networked devices has to be stored, at least for a time, in the border router. In particular, security information for device authentication must be stored in non-volatile memory, such as Flash memory, because it is required for long term use. Additionally, any one border router can only handle a limited amount of authentication overhead, such as security handshakes, at a time, because of the processor resource these activities consume. All these factors place burdens on the border routers and on the network communication channels.

Turning now to FIG. 1, there is shown a much simplified view of a reduced set of connections in a multihop network such as a multihop mesh network (for example, one using Routing Protocol for Low power and Lossy Networks (RPL)). As described above, in such a network, packets are routed hop-by-hop from originator to destination, typically by way of one or more intermediate nodes. In the present arrangement, it will be seen that network 100 comprises a controlling router device, such as a Border router 102, which is connected to the Internet 101 and to other, non-border-router devices 103 in the network. For the purposes of the example, the non-border-router devices 103 in the figure are named as either "Node N" or "Router N"—this has no technical significance, but the devices designated "Router N" are those which will be discussed in detail hereinbelow, while those designated "Node N" are shown to illustrate the general structure of a multihop network. The devices may be located at differing numbers of hops from the Border router 102. Thus, for example, Router 1 104 and Node 2 106 are located (physically or logically) at one hop from the Border router 102, while Nodes 3, 5 and 6 (respectively 108, 112, 114) and Router 2 110 are located at two hops from Border router 102. Router 3 116 and Node 8 118 are located at hop 3 from the Border router 102, and Router 4 120 is located at hop 4. Nodes 3, 5 and 6 may themselves be routers, or they may be leaf nodes. In either case, they take no part in the following discussion, which will concentrate for the sake of simplicity on a single route from the border of the network under consideration to a destination within that network.

As will be clear to one of skill in the art, the representation of network 100 in FIG. 1 is much simplified, and in any real-world implementation, many more nodes and a much more complex mesh of interconnections would exist.

Figure 2:
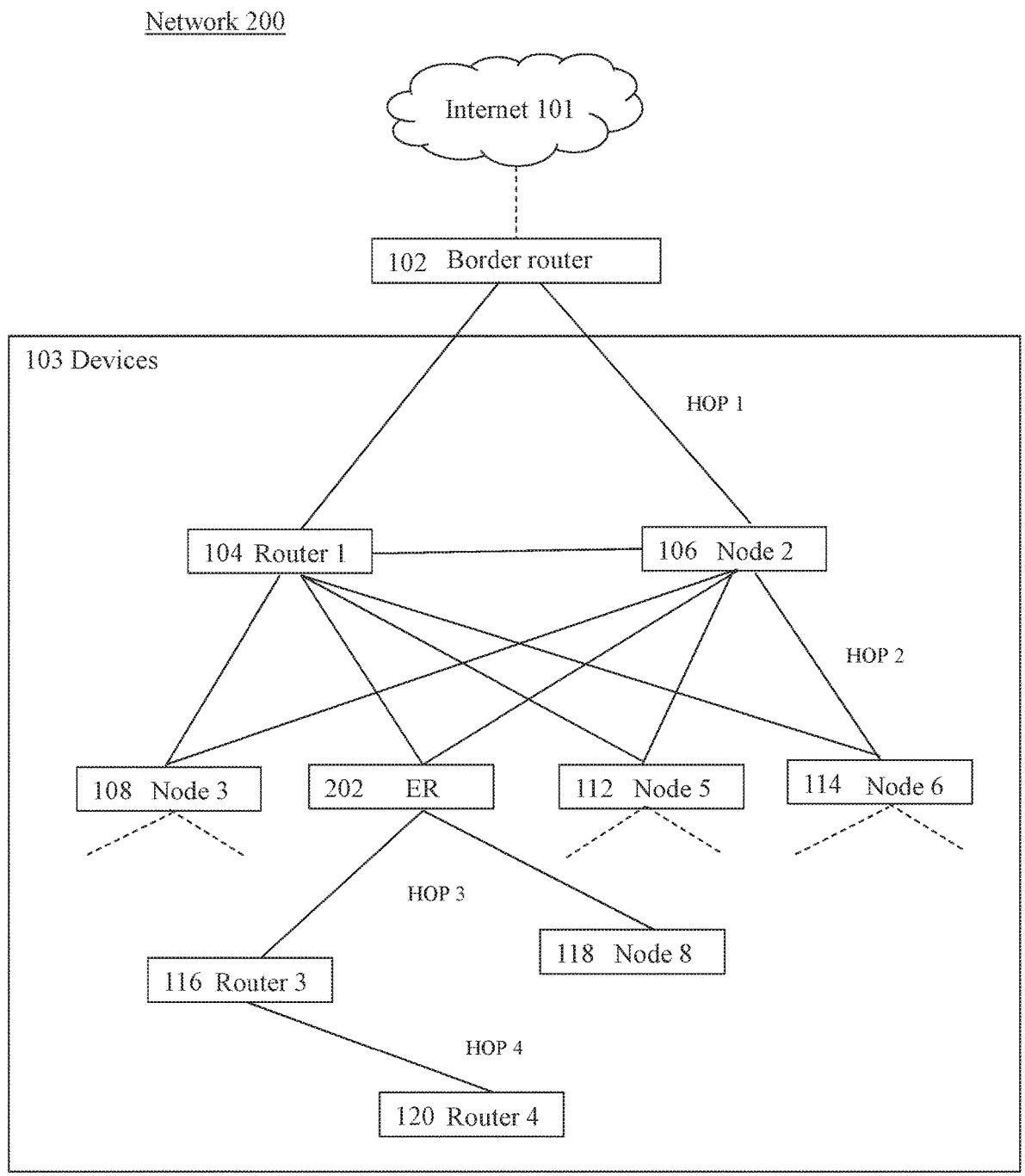
FIG. 2 shows a simplified view of some connections in a network in which an extender router device according to an embodiment of the presently described technology has been incorporated.

Turning now to FIG. 2, there is shown a simplified view of some connections in a network 200 in which an extender router device according to an embodiment of the presently described technology has been incorporated. In FIG. 2, Internet 101, Border router 102, non-border-router devices 103 including Nodes 106 at hop 1, 108, 112, 114 at hop 2 and 118 at hop 3 are all as in FIG. 1. In FIG. 2, extender router device ER 202 has been attached to the network 200, where it assumes routing control over a sub-network comprising non-border-router Router 3 116 at hop 3 and non-border-router Router 120 at hop 4. The operation of extender router device ER 202 in relation to Border router 102, Router 1

104, Router 3 116 and Router 4 120 will be made clear hereinbelow with reference to further figures and the description of the sub-network addressing mechanisms according to implementations of the present technology.

Figure 3:
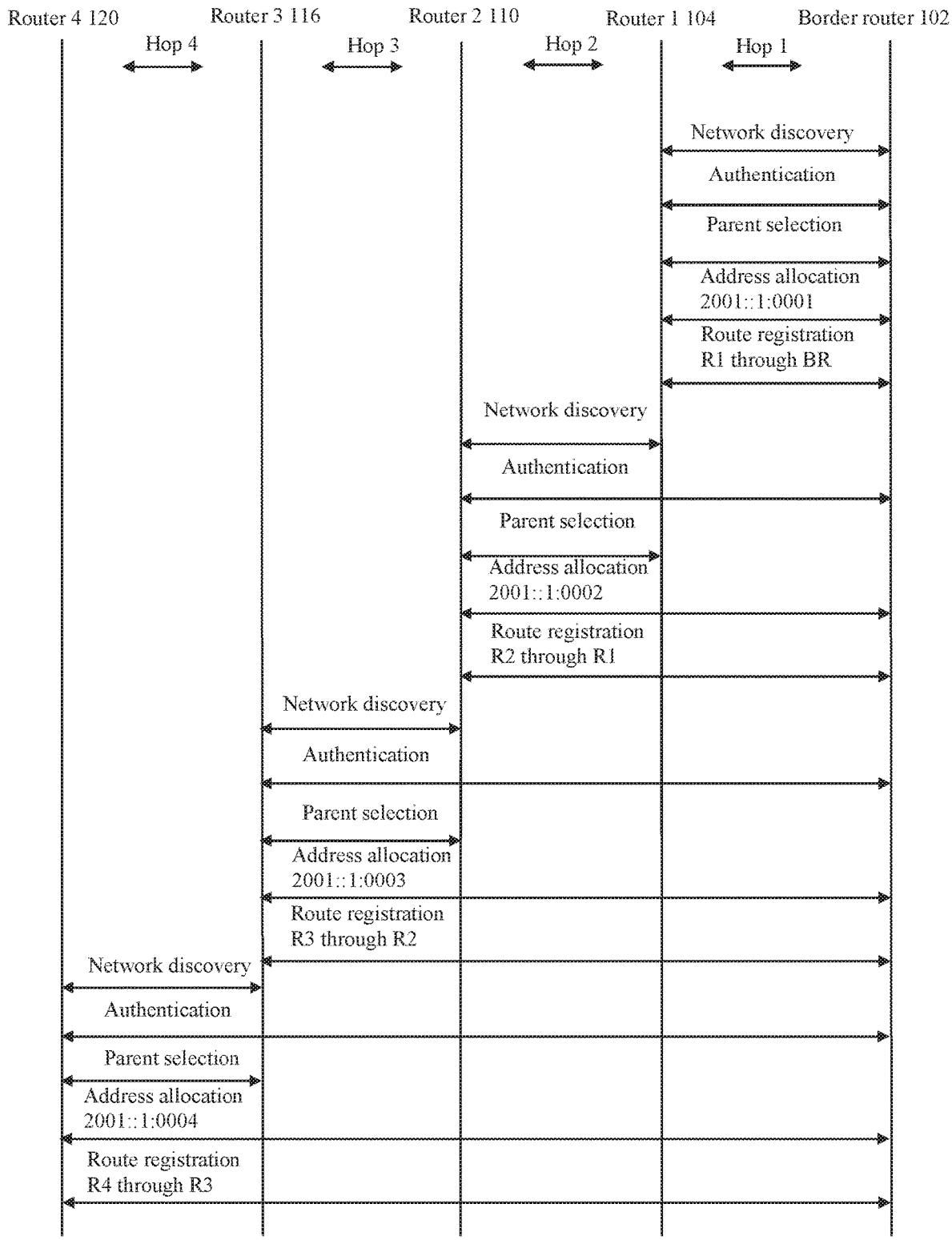
FIG. 3 shows a simplified example of the communication flows for device attachment in a conventional multihop network.

Turning now to FIG. 3, there is shown a simplified example of the communication flows 300 for device attachment in a conventional multihop network. Starting from the right of the figure, the border router performs network discovery and locates router 1 at hop 1. The border router authenticates router 1 and the pair perform the parent selection process. The border router allocates address 2001:: 1:0001 to router 1 and registers the route R1 through BR. The addressing, authentication and registration information is stored in non-volatile storage at the border router. This completes the flow for attachment of router 1, the first of the non-border-router nodes. Router 1 then performs network discovery, locates router 2 and requests authentication of router 2 by the border router. The border router authenticates router 2 and router 2 performs the parent selection process with router 1. Parent selection follows an agreed process according to the network protocol standard that is implemented: for example, a parent may be selected according to a ranking arrangement established during network formation, or a parent may be selected according to channel transmission characteristics of the available routes in the network. After parent selection, the border router allocates address 2001::1:0002 to router 2 and registers the route R2 through R1. The addressing, authentication and registration information is stored in non-volatile storage at the border router. This completes the flow for attachment of router 2. The attachment flow is repeated for each successive non-border-router node in the path.

It will be appreciated by one of ordinary skill in the art that FIG. 3 shows only a very small part of a network, being restricted as it is to a single linear path from a border router to a node at hop 4. In any real-world network there would be many more nodes and many more paths through the nodes. Even so, it will be clear from this simplified example that the border router's involvement at every hop of the process places a significant burden on the border router's processor resource, and that the necessity for storing the addressing, authentication and registration information for each node places a significant burden on the border router's non-volatile storage. The communications bandwidth resource at the border router is also affected by the authentication and registration messages for each node.

Figure 4:
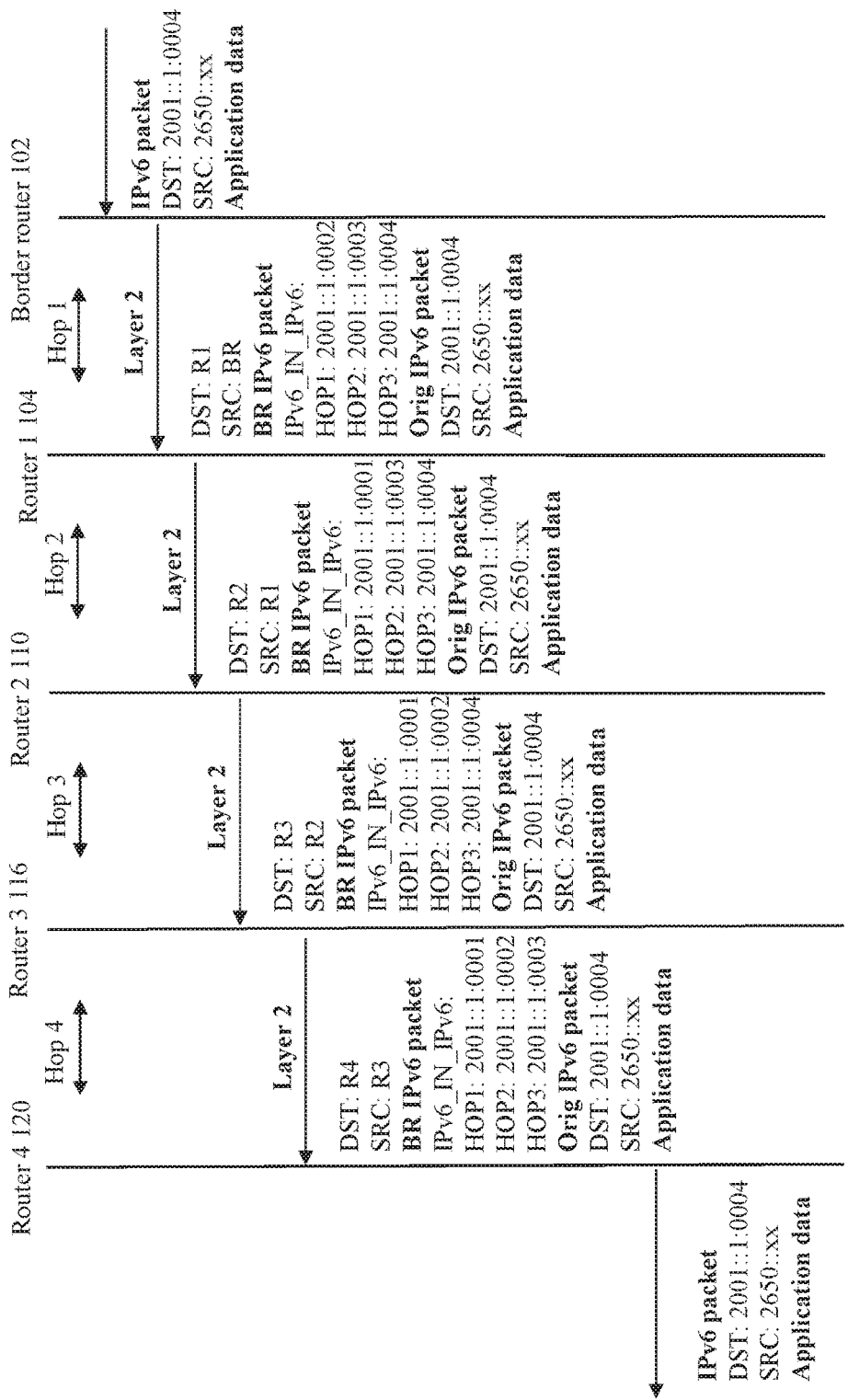
FIG. 4 shows a simplified example of the communication flows involved in packet routing in a conventional multihop network.

To continue with the description of the operation of a conventional multihop network, in FIG. 4 is shown a simplified example of the communication flows 400 involved in packet routing in a conventional multihop network. In FIG. 4, Border router 104 acquires an IPv6 (Internet Protocol version 6) packet from a source external to the multihop network, which source may be, for example, the Internet. Typically, the source may form part of a Cloud and be mediated by means of one or more Cloud servers. The IPv6 packet identifies its destination DST and its source SRC, typically by means of a protocol header. The protocol header is normally followed by the payload of application data. Before the packet is forwarded by Border router 102, it is wrapped in a Layer 2 packet structure suitable for processing by the intermediate routers in the multihop network. This wrapping (and subsequent unwrapping) process may follow, for example, the IPv6 tunneling protocol. Tunneling is a technique for establishing a "virtual link" between two IPv6 nodes and transmitting data packets, which may be IPv6 packets, as payloads of IPv6 packets. From the point of view of the two nodes, this "virtual link", called an IPv6 tunnel, appears as a point to point link on which IPv6 acts like a link-layer protocol. The two IPv6 nodes play specific roles. One node encapsulates original IPv6 packets and forwards the resulting wrapped packets. The other node decapsulates the received tunnel packets to retrieve the original IPv6 packet.

For traversing hop 1 from the Border router 102 to router 1 104, the Layer 2 packet structure comprises destination identifier DST R1 and source identifier SRC BR followed by the border router IPv6 packet comprising HOP addresses (HOP 1, HOP 2, HOP 3) for all the nodes along its route to the destination address at router 4 120. As will be immediately apparent to one of ordinary skill in the art, the example shown here comprises an atypically short path from source to destination, and in a typical real-world network, the number of hops and thus the size of the Layer 2 packet structure will be much larger. The original IPv6 packet comprising source and destination addresses and application data forms the inner payload of the Layer 2 packet structure.

In traversing the remaining nodes to the destination node, the Layer 2 packet structure wrapping the original IPv6 packet is passed on hop-by-hop, the hop addresses mutating to record progress through the multihop network as shown in the figure. On arrival at router 4 120, the destination node, the Layer 2 packet structure is unwrapped to supply the original IPv6 packet comprising source and destination addresses and application data, ready for processing by the destination node.

Figure 5:
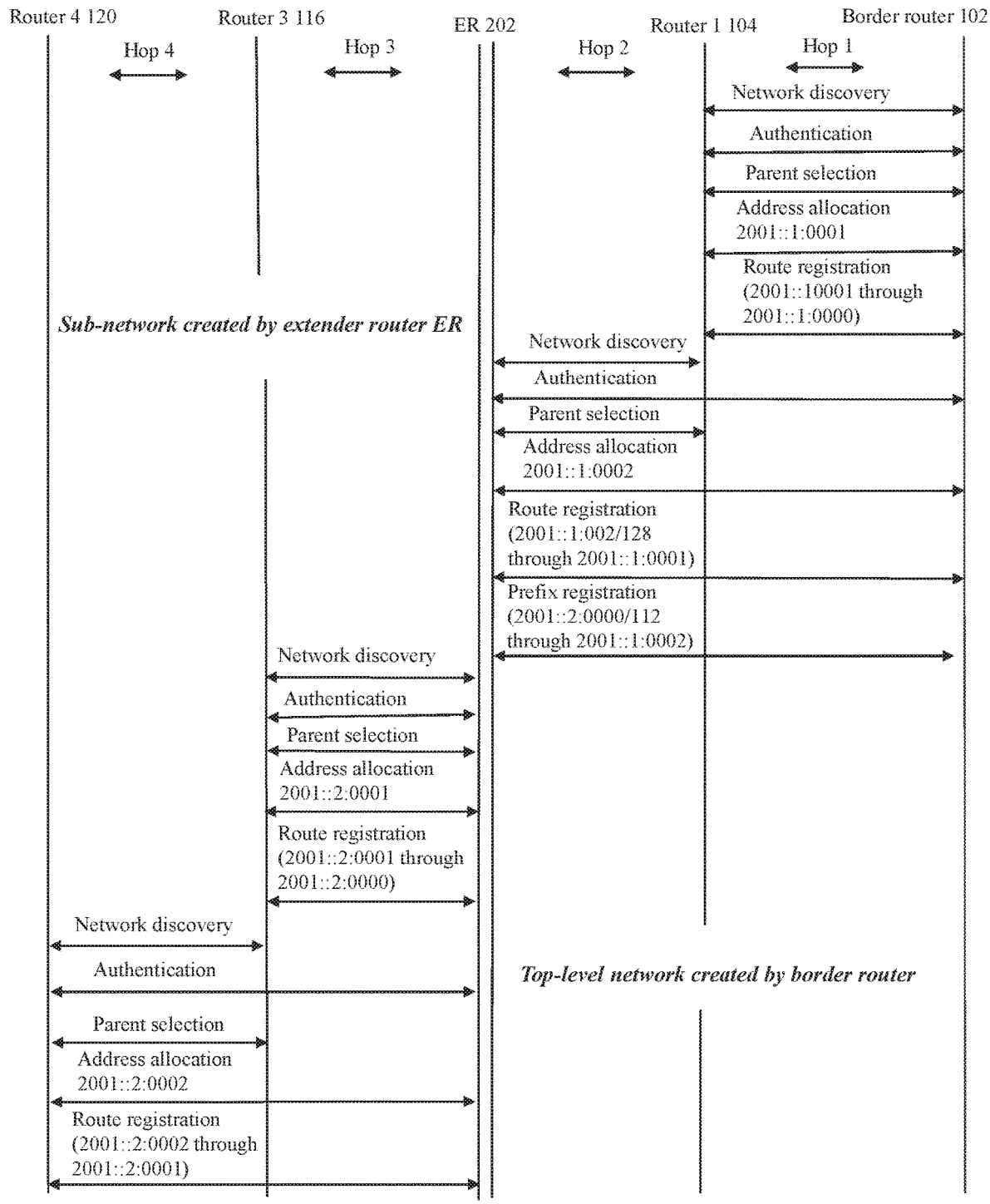
FIG. 5 shows a simplified example of the communication flows for device attachment in a network having an extender router device according to an implementation of the presently described technology.
Figure 6:
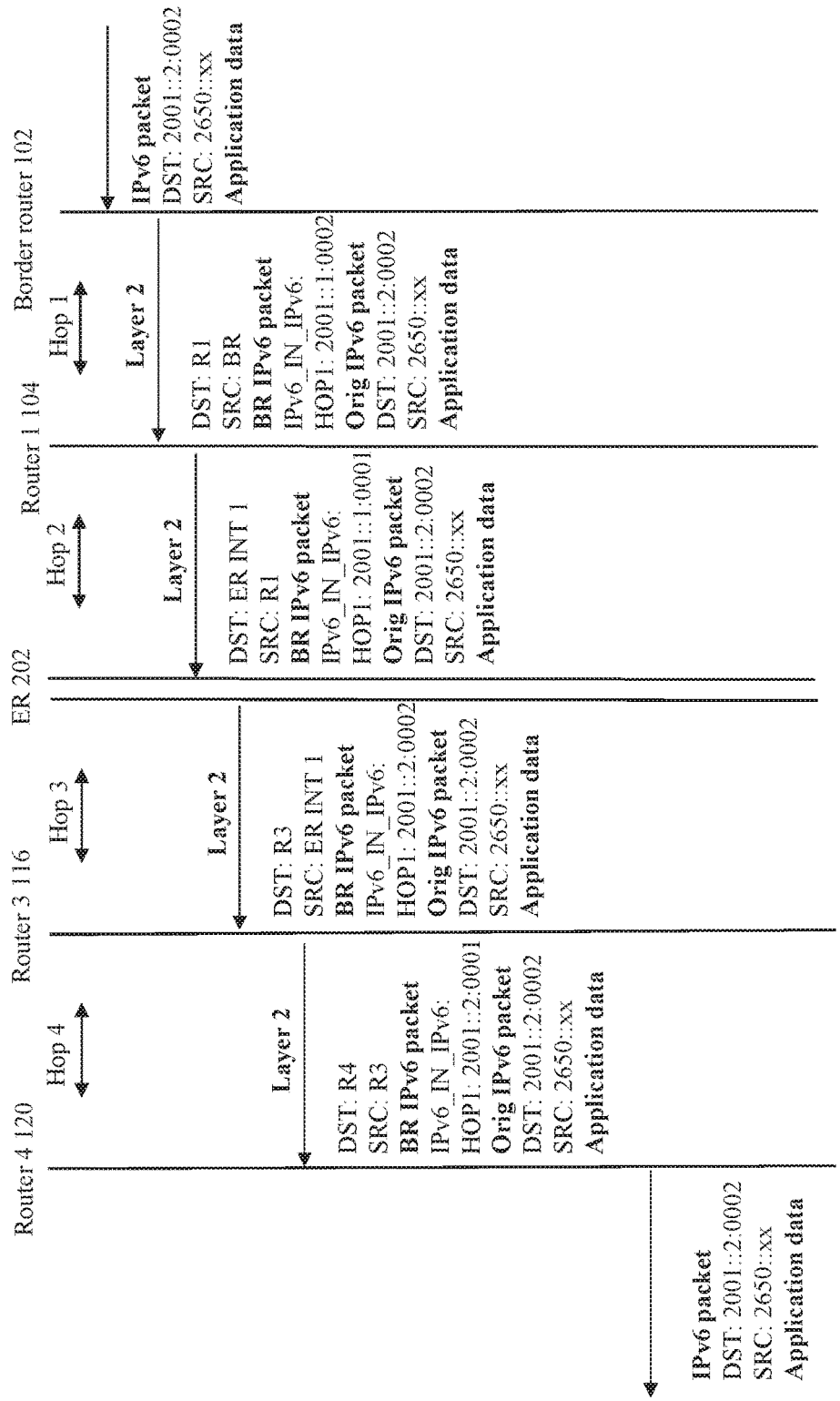
FIG. 6 shows a simplified example of the communication flows involved in packet routing in a network having an extender router device according to an implementation of the presently described technology.

From the examples of conventional multihop network operation given in FIGS. 3 and 4, it will be clear that the processing and storage burdens on the border router 102, the bandwidth burden on the network, and the complexity and therefore the fragility) of the intermediate routing are all considerable. FIGS. 5 and 6 show the manner in which these burdens can be reduced using an implementation of the extender router device according to the present technology.

FIG. 5 shows a simplified example of the communication flows for device attachment in a network having an extender router device according to an implementation of the presently described technology.

Starting from the right of the figure, the border router performs network discovery and locates router 1 at hop 1. The border router authenticates router 1 and the pair perform the parent selection process. Parent selection follows an agreed process according to the network protocol standard that is implemented: for example, a parent may be selected according to a ranking arrangement established during network formation, or a parent may be selected according to channel transmission characteristics of the available routes in the network. After parent selection, the border router allocates address 2001::1:0001 to router 1 and registers routes. The addressing, authentication and registration information is stored in non-volatile storage at the border router. This completes the flow for attachment of router 1, the first of the non-border-router nodes. Router 1 then performs network discovery, locates the extender router 202 and requests authentication of extender router 202 by the border router. The border router authenticates extender router 202 and router 2 performs the parent selection process with router 1. The border router allocates an address 2001::1: 0002 to router 2 and registers an address range and prefix identifier to extender router 202. This addressing and prefixing mechanism permits extender router 202 to assume the responsibilities for controlling routing for a subset of the network devices identified as having addresses within the range of addresses that has been registered to the extender router 202—routing for these network devices would normally have been handled by border router 102. The addressing, authentication and registration information for extender router 202 is stored in non-volatile storage at the border router, but the data to be stored in this way is significantly smaller than the corresponding information for all the nodes of the sub-network in a conventional arrangement. This completes the flow for attachment of extender router 202. As shown in the figure, border router 102, router 1 104 and extender router 202 are operable to communicate in the conventional manner in the top-level network created by border router 102. Extender router 202 is further operable to communicate with its sub-network, to which, in the example, belong router 3 116 and router 4 120.

As will be clear from the figure and the above description, the extender router of the present technology alleviates the processing and memory burdens of border router 102 by taking on responsibility for the authentication and addressing functions without the repeated reversion to border router 102 that was seen in FIG. 3.

FIG. 6 shows a simplified example of the communication flows involved in packet routing in a network having an extender router device according to an implementation of the presently described technology. In FIG. 6, Border router 104 acquires an IPv6 (Internet Protocol version 6) packet from a source external to the multihop network, as in FIG. 4. The IPv6 packet identifies its destination DST 2001::2:0002 and its source SRC in its protocol header, followed by the payload of application data. Before the packet is forwarded by Border router 102, it is wrapped in a Layer 2 packet structure suitable for processing by the intermediate routers in the multihop network, using the wrapping or encapsulation method described above.

For traversing hop 1 from the Border router 102 to router 1 104, the Layer 2 packet structure comprises destination identifier DST R1 and source identifier SRC BR followed by the border router IPv6 packet comprising the address at HOP 1:2001::1:0002 for the router 1 node 104 along its route to the extender router 202. The original IPv6 packet comprising source and destination addresses and application data forms the inner payload of the Layer 2 packet structure.

After traversing router 1 104 to the extender router 202, the Layer 2 packet is received by the extender router 202 acting as a destination. The Layer 2 packet structure wrapping the original IPv6 packet is unwrapped and the Layer 2 packet structure is then rebuilt by extender router 202 to handle routing in the sub-network. The rebuild comprises removing routing hop information relating to the main network through which the packet has been routed, and replacing it with the routing hop information relating to the sub-network for which the extender router 202 is responsible. The routing hop information is determined from the registered sub-network address and routing information stored at the extender router 202 for the destination in the original IPv6 packet. The routing hop information is then used to rebuild the Layer 2 packet structure around the same original IPv6 packet so that the addressing and routing information relates only to the routing through the sub-network.

In traversing the remaining nodes to the destination node, the rebuilt Layer 2 packet structure wrapping the original IPv6 packet is passed on hop-by-hop, the hop addresses mutating as it progresses through the multihop network as shown in the figure. On arrival at router 4 120, the destination node, the Layer 2 packet structure is unwrapped to supply the original IPv6 packet comprising source and destination addresses and application data, ready for processing by the destination node.

By comparing the packet structures in FIGS. 4 and 6, it will be seen that, in addition to addressing the burdens on the border router, the transmission burden of the protocol headers is reduced in networks using the extender router of the present technology. As will be immediately apparent to one of ordinary skill in the art, the example shown here comprises only a very simple transmission, and the corresponding alleviation of the transmission burden in a real-world scenario will be significant.

Figure 7:
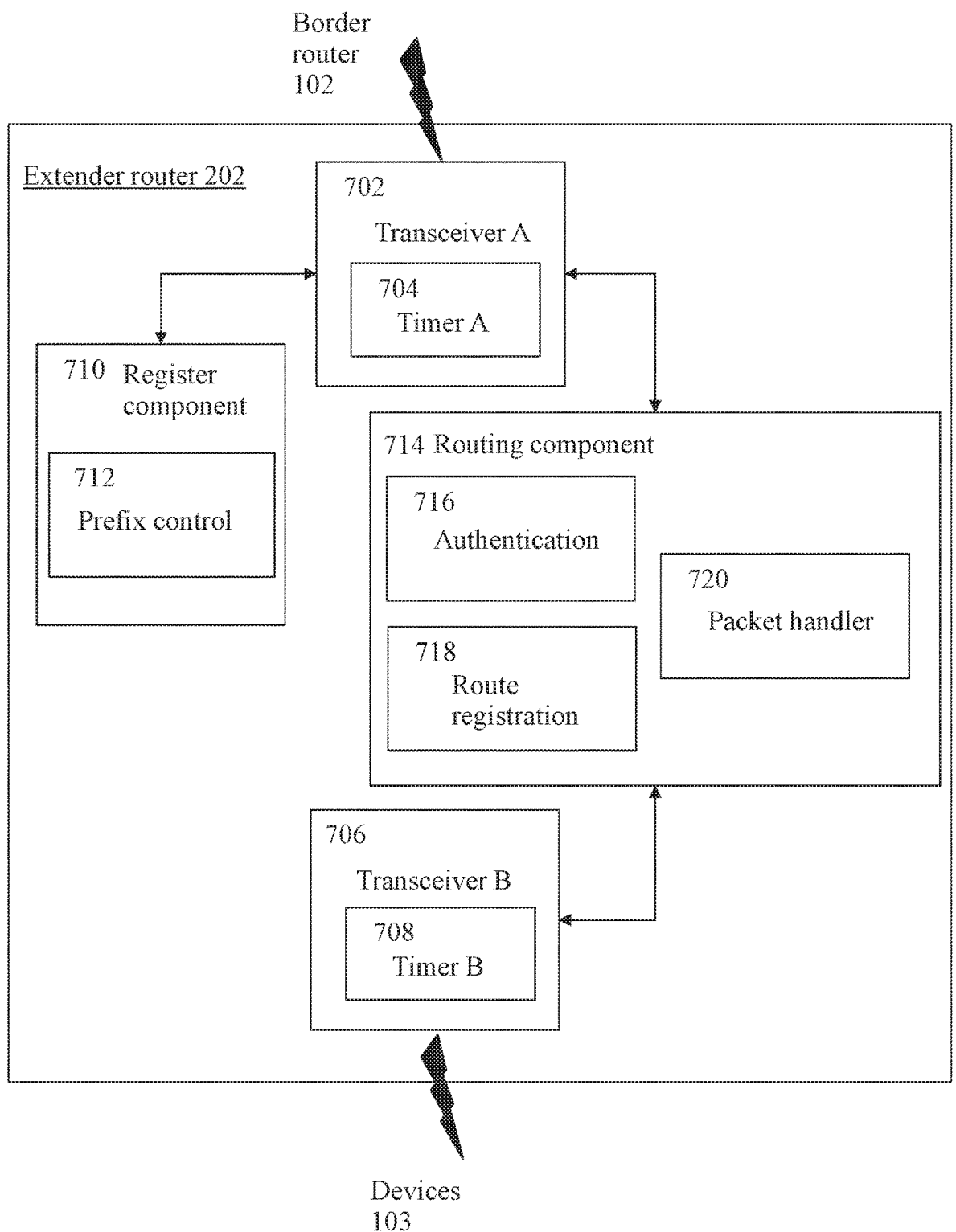
FIG. 7 shows a simplified representation of one possible structure of an extender router device according to an implementation of the presently described technology.

FIG. 7 shows a simplified representation of one possible structure of an extender router device according to an implementation of the presently described technology. In FIG. 7, extender router 202 is operable in electronic communication with a border router 102 and with devices 103. The electronic communication may be over a wireless signal medium, which may comprise any of the available short or long-range wireless radio frequency communications technologies. Extender router 202 is provided with a first transceiver, Transceiver A 702, which is operable to communicate with the border router 102 to send and receive packets. Transceiver A 702 comprises a timer component, Timer A 704 for regulating the timing of transmit and receive slots. Transceiver A is operable with Register component 710 and Prefix component 712 to register with the border router 102 its availability to perform routing control activities for a subset of network devices identified using assigned prefixes. After registering its availability to perform routing control activities for a subset of network devices identified using assigned prefixes, Transceiver A 702 is further operable to communicate with Routing component 714 on receipt of packets identified as pertaining to the subset of network devices identified using the assigned prefixes. Routing component 714 is operable to authenticate members of the subset of network devices identified using assigned prefixes and to register routing information for those members of the subset. Extender router 202 thus assumes responsibility for storing the authentication and route registration information for the members of the subset of network devices identified using assigned prefixes, thereby relieving border router 102 of the corresponding storage requirement. Routing component 714 further comprises Packet handler 720 which is operable to perform routing control activities for packets received at Transceiver A 702 from Border router 102 to be routed through the subset of network devices identified using the assigned prefixes. Extender router 202 further comprises Transceiver B 706 which is operable to communicate with devices 103, and which is equipped with a timer component, Timer B 708 for regulating the timing of transmit and receive slots. Routing component 714 is operable in communication with Transceiver B to send and receive packets to and from network devices in accordance with the timing of slots regulated by Timer B 708.

Figure 8:
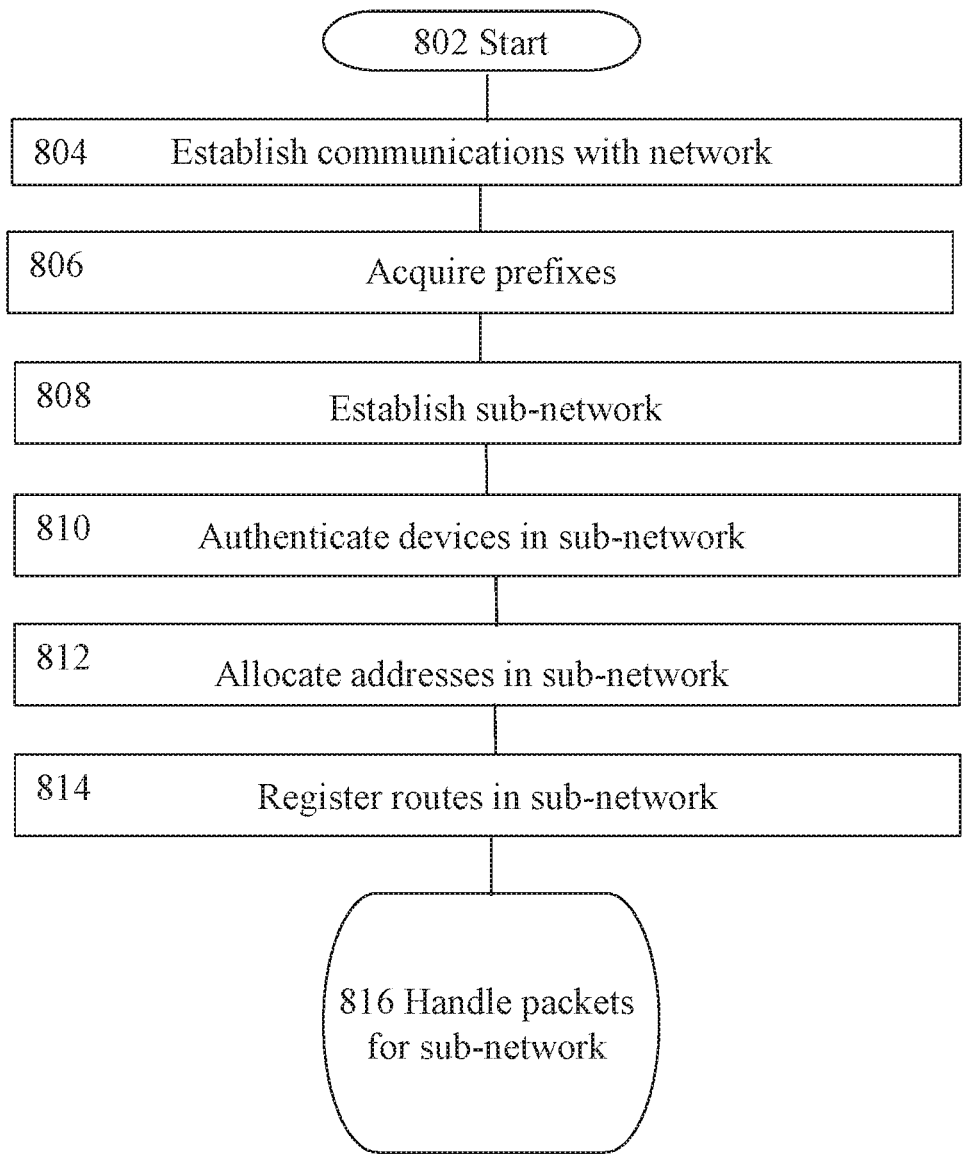
FIG. 8 shows an example of a method of operation of an extender router device according to an implementation of the presently described technology.

FIG. 8 shows an example of a method 800 of operation of an extender router device according to an implementation of the presently described technology. The method 800 begins at 802 at which the extender router 202 establishes communications with the network 200. At 806, the extender router 202 acquires a set of assigned prefixes from border router 102. At 808, the extender router 202 establishes a sub-network of devices 103 for which it will assume routing control responsibility. At 810, extender router 202 authenticates devices in the sub-network. At 812, extender router 202 allocates addresses to devices in the sub-network, and at 814, extender router 202 registers routes among the devices in the sub-network. At each of 810, 812, 814, extender router 202 stores the relevant information in its non-volatile storage for use during normal packet handling processing. At 816, extender router 202 begins to handle packets for the members of the sub-network of network devices identified using the assigned prefixes, routing the packets to destination nodes in the sub-network using the registered routes and addresses stored in its non-volatile storage.

As will be appreciated by one skilled in the art, the present technique may be embodied as a system, method or computer program product. Accordingly, the present technique may take the form of an entirely hardware embodiment, an entirely software embodiment, or an embodiment combining software and hardware. Where the word "component" is used, it will be understood by one of ordinary skill in the art to refer to any portion of any of the above embodiments.

Furthermore, the present technique may take the form of a computer program product embodied in a non-transitory computer readable medium having computer readable program code embodied thereon. The computer readable medium may be a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction-set to high-level compiled or interpreted language constructs.

It will also be clear to one of skill in the art that all or part of a logical method according to embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored using fixed carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, an embodiment of the present technique may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present technique.

The invention claimed is:

1. An extender device for communication in a multi-hop network, comprising:
a first wireless transceiver operable in electronic communication with a border router;
a second wireless transceiver operable in electronic communication with one or more network attachable devices; and
a routing electronic circuit-electronically connected to said first transceiver and said second transceiver and operable to cause said extender device to assume routing control of messages received at said first wireless transceiver for one or more said network attachable devices operable to handle messages having a specified identifier;
said routing electronic circuit further operable in response to receiving a message with said specified identifier, to rebuild said message for onward routing by removing routing hop information relating to a main network through which the message is routed, and replacing it with the routing hop information relating to said one or more said network attachable devices.

2. The extender device according to claim 1, said first wireless transceiver operable in electronic communication with said border router being operable in direct communication with said border router.

3. The extender device according to claim 1, said first wireless transceiver operable in electronic communication with said border router being operable in indirect communication with said border router by way of a route comprising one or more intermediate network attachable devices.

4. The extender device according to claim 1, further comprising a register electronic circuit operable to register said extender device with said border router as a destination for messages having said specified identifier.

5. The extender device according to claim 1, further comprising a register electronic circuit operable to register addresses of said one or more network attachable devices with said extender device.

6. The extender device according to claim 1, further comprising a register electronic circuit operable to register routing information for said one or more network attachable devices with said extender device.

7. The extender device according to claim 1, said routing electronic circuit operable in response to said specified identifier in the form of an address prefix.

8. The extender device according to claim 1, said routing electronic circuit operable in response to said specified identifier in the form of an address prefix identifying said specified identifier as belonging to a range of said network attachable devices.

9. The extender device according to claim 1, said first wireless transceiver operable to communicate with said border router across the main network under routing control of said border router.

10. The extender device according to claim 1, further operable to establish a sub-network of said one or more network attachable devices operable to handle packets having said specified identifier.

11. The extender device according to claim 1, said second wireless transceiver operable with a second timing parameter set independent of a first timing parameter set of said first wireless transceiver.

12. The extender device according to claim 1, said routing electronic circuit further operable to store routing path information for said one or more network attachable devices.

13. The extender device according to claim 1, said routing electronic circuit further operable to allocate and store address information for said one or more network attachable devices.

14. The extender device according to claim 1, said routing electronic circuit further operable to perform authentication for said subset of said one or more network attached devices.

15. The extender device according to claim 1, said second wireless transceiver operable according to a second wireless protocol independent of a first wireless protocol of said first wireless transceiver.

16. A method of operation of an extender device for communication in a multi-hop network, comprising:
operating a first wireless transceiver in electronic communication with a border router;
operating a second wireless transceiver in electronic communication with one or more network attachable devices; and
operating a routing electronic circuit electronically connected to said first transceiver and said second transceiver to cause said extender device to assume routing control of messages received at said first wireless transceiver for one or more said network attachable devices operable to handle messages having a specified identifier; further operating said routing electronic circuit in response to receiving a message with said specified identifier, to rebuild said message for onward routing by removing routing hop information relating to a main network through which the message is routed, and replacing it with the routing hop information relating to said one or more said network attachable devices, thereby reducing a processing and memory burden of routing messages from a border router to an end destination.

17. A computer program product stored on a non-transitory computer-readable medium and comprising computer instructions to instruct an extender device for communication in a multi-hop network to:
operate a first wireless transceiver in electronic communication with a border router;
operate a second wireless transceiver in electronic communication with one or more network attachable devices; and
operate a routing electronic circuit electronically connected to said first transceiver and said second transceiver to cause said extender device to assume routing control of messages received at said first wireless transceiver for one or more said network attachable devices operable to handle messages having a specified identifier and further operate said routing electronic circuit in response to receiving a message with said specified identifier, to rebuild said message for onward routing by removing routing hop information relating to a main network through which the message is routed, and replacing it with the routing hop information relating to said one or more said network attachable devices, thereby reducing a processing and memory burden of routing messages from a border router to an end destination.

* * * * *